United States Patent
Liang et al.

(10) Patent No.: US 8,456,858 B2
(45) Date of Patent: Jun. 4, 2013

(54) SERIAL ADVANCED TECHNOLOGY ATTACHMENT DUAL IN-LINE MEMORY MODULE ASSEMBLY

(75) Inventors: An-Gang Liang, Shenzhen (CN);
Hung-Yi Wu, New Taipei (TW);
Zheng-Heng Sun, New Taipei (TW)

(73) Assignees: Hong Fu Jin Precision Industry (ShenZhen) Co., Ltd., Shenzhen (CN);
Hon Hai Precision Industry Co., Ltd., New Taipei (TW)

( * ) Notice: Subject to any disclaimer, the term of this patent is extended or adjusted under 35 U.S.C. 154(b) by 84 days.

(21) Appl. No.: 13/278,090

(22) Filed: Oct. 20, 2011

(65) Prior Publication Data
US 2013/0070411 A1    Mar. 21, 2013

(30) Foreign Application Priority Data
Sep. 15, 2011  (CN) .......................... 2011 1 0273425

(51) Int. Cl.
*H05K 1/14*  (2006.01)
*H05K 1/11*  (2006.01)

(52) U.S. Cl.
USPC ................. 361/785; 361/679.31; 361/679.32; 361/679.41; 361/737; 361/748; 361/803

(58) Field of Classification Search
USPC ............ 361/679.01, 679.02, 679.03, 679.31, 361/679.32, 679.4, 679.41, 728, 737, 748, 361/785–789, 803, 792
See application file for complete search history.

(56) References Cited

U.S. PATENT DOCUMENTS

| | | | | |
|---|---|---|---|---|
| 4,885,482 | A * | 12/1989 | Sharp et al. | 326/47 |
| 5,793,617 | A * | 8/1998 | Dent | 361/785 |
| 5,963,431 | A * | 10/1999 | Stancil | 361/803 |
| 6,647,451 | B1 * | 11/2003 | Barmore | 710/301 |
| 7,742,291 | B2 * | 6/2010 | Wu et al. | 361/679.32 |
| 2006/0105597 | A1 * | 5/2006 | Purwin | 439/79 |
| 2009/0257184 | A1 * | 10/2009 | Lee et al. | 361/679.32 |
| 2012/0212988 | A1 * | 8/2012 | Sugita et al. | 365/51 |

* cited by examiner

*Primary Examiner* — Hoa C Nguyen
(74) *Attorney, Agent, or Firm* — Altis Law Group, Inc.

(57) ABSTRACT

A serial advanced technology attachment dual-in-line memory module (SATA DIMM) assembly includes a SATA DIMM module with a circuit board and a cable member. A first edge connector is set on a bottom edge of the circuit board to be connected to a memory slot of a motherboard. A second edge connector is arranged on an end of the circuit board. The cable member includes a cable, a first storage device interface extending from a first end of the cable to be connected to a second storage device interface of the motherboard, and a third edge connector formed on a second end of the cable and soldered to the second edge connector.

4 Claims, 4 Drawing Sheets

SERIAL ADVANCED TECHNOLOGY ATTACHMENT DUAL IN-LINE MEMORY MODULE ASSEMBLY

BACKGROUND

1. Technical Field

The present disclosure relates to a serial advanced technology attachment dual in-line memory module (SATA DIMM) assembly.

2. Description of Related Art

Solid state drives (SSD) store data on chips instead of on magnetic or optical discs. One type of SSD has the form factor of a DIMM and it is called a SATA DIMM module. The SATA DIMM module can be inserted into a memory slot of a motherboard, to receive voltages from the motherboard through the memory slot. However, hard disk drive (HDD) signals need to be transmitted between the SATA DIMM module and the motherboard through SATA connectors arranged on the SATA DIMM module and connected to a SATA connector of the motherboard. When the SATA DIMM module is inserted into a memory slot of the motherboard, the SATA connector of the SATA DIMM module is connected to the SATA connector of the motherboard. t However, the SATA connector may physically interfere with memory cards in other memory slots, which are arranged on the motherboard and adjacent to the memory slot connected to the SATA DIMM module therefore, there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The disclosure, including the drawings, is illustrated by way of example and not by limitation. References to "an" or "one" embodiment in this disclosure are not necessarily to the same embodiment, and such references mean at least one.

Figure 1:
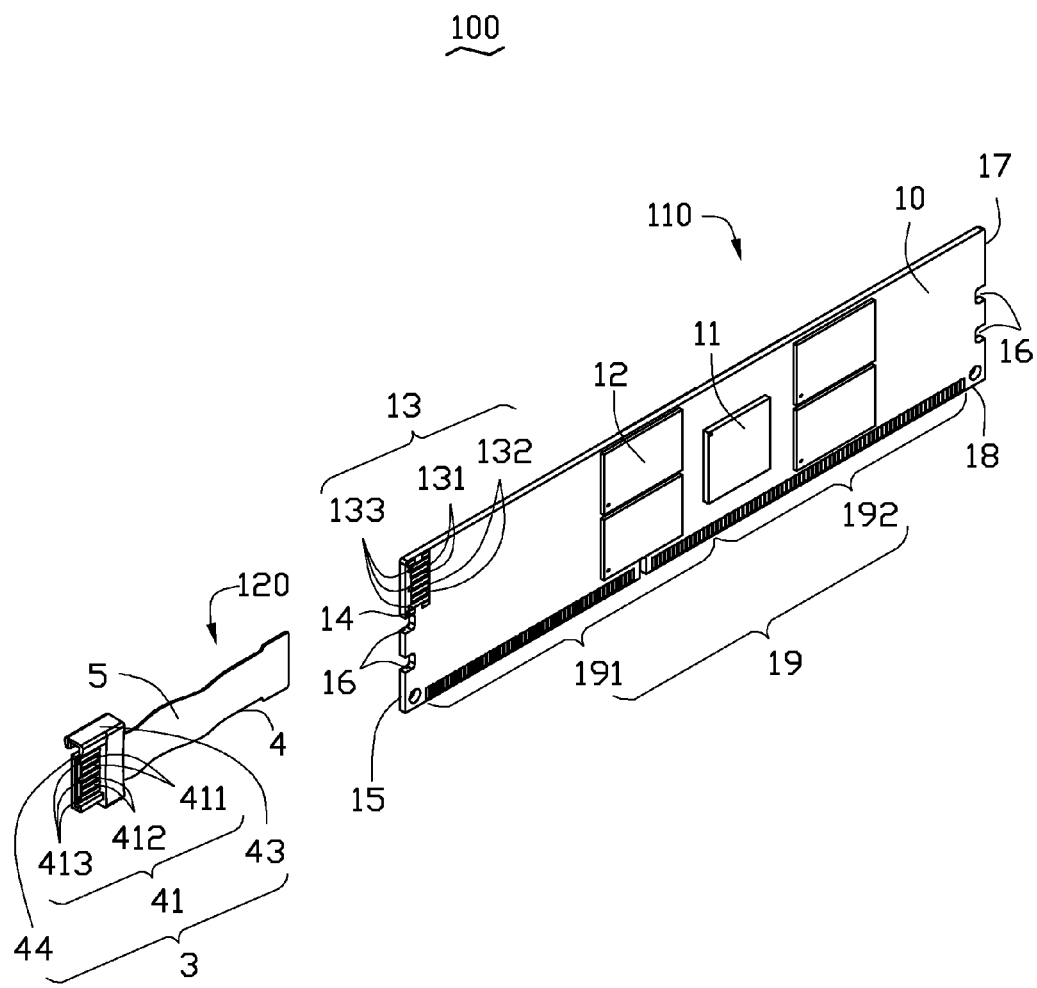
FIG. 1 is an exploded, isometric view of a serial advanced technology attachment dual in-line memory module (SATA DIMM) assembly in accordance with an exemplary embodiment of the present disclosure, the SATA DIMM module assembly includes a cable member and a SATA DIMM module.
Figure 2:
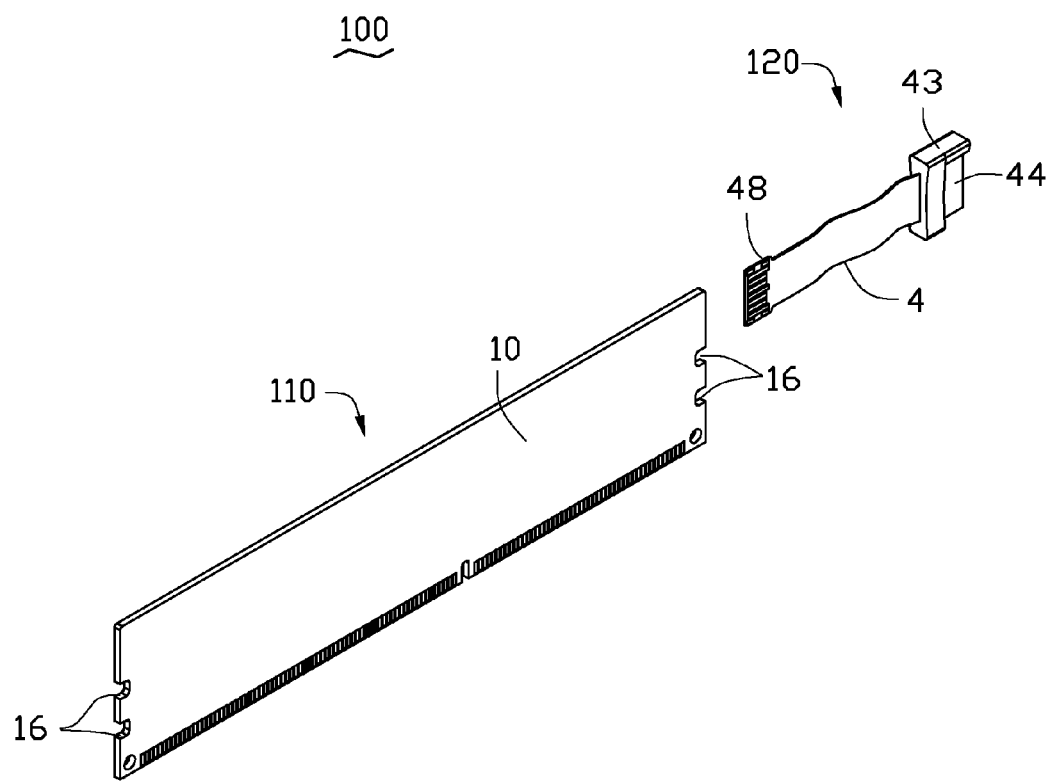
FIG. 2 is similar to FIG. 1, but viewed from another perspective.
Figure 4:
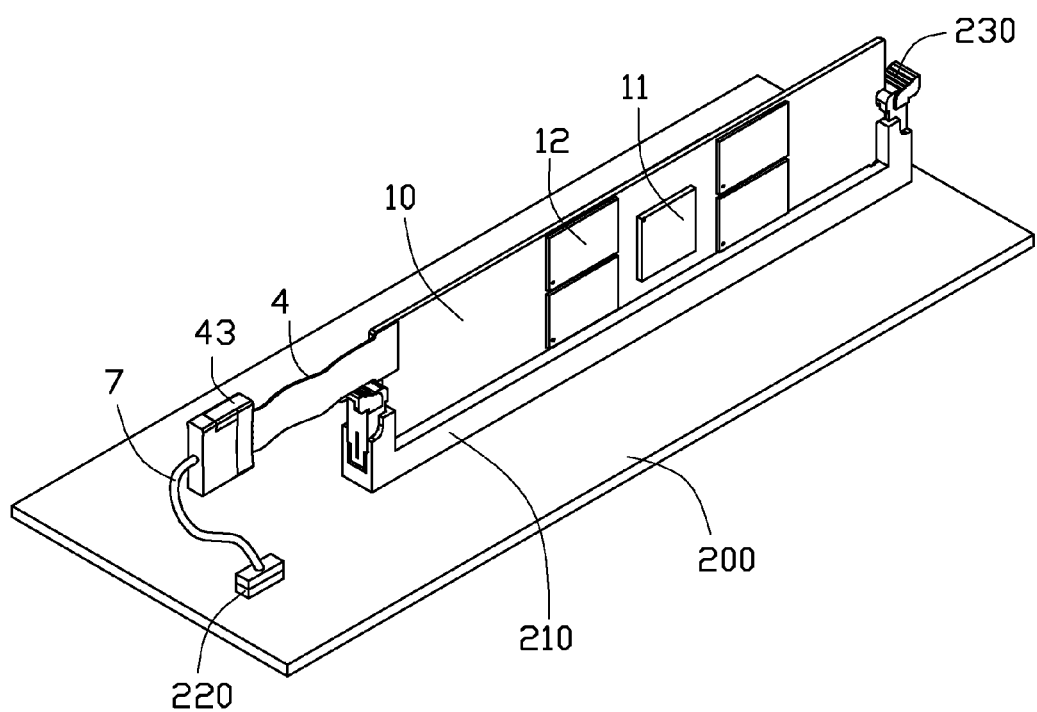
FIG. 4 is an assembled, isometric view of the SATA DIMM module assembly of FIG. 1 connected to a motherboard.

Referring to FIGS. 1, 2, and 4, a serial advanced technology attachment dual-in-line memory module (SATA DIMM) assembly 100 in accordance with an exemplary embodiment includes a SATA DIMM module 110 and a cable member 120.

The SATA DIMM module 110 includes a substantially rectangular circuit board 10. A control chip 11 and a plurality of storage chips 12 connected to the control chip 11 are arranged on the circuit board 10. A first edge connector 19 is arranged on a long edge 18 of the board 10, to be inserted into a memory slot 210 of a motherboard 200. The first edge connector 19 includes a plurality of power pins 191 and a plurality of ground pins 192. The power pins 191 are connected to the control chip 11 and the storage chip 12. The ground pins 192 are connected to a ground layer (not shown) of the circuit board 10. A second edge connector 13 and four fixing pads 14 located around the second edge connector 13 are arranged on an upper left corner of the circuit board 10 and adjacent to a short edge 15 of the board 10. The second edge connector 13 includes a pair of signal input pins 131, a pair of signal output pins 132, and three ground pins 133. The signal input pins 131 and the signal output pins 132 of the second edge connector 13 are connected to the control chip 11. The ground pins 133 of the second edge connector 13 are connected to the ground layer. Two grooves 16 are defined in the short edge 15 and are located below the second edge connector 13. Another two grooves 16 are defined in a short edge 17 of the circuit board 10 opposite to the short edge 15.

Figure 3:
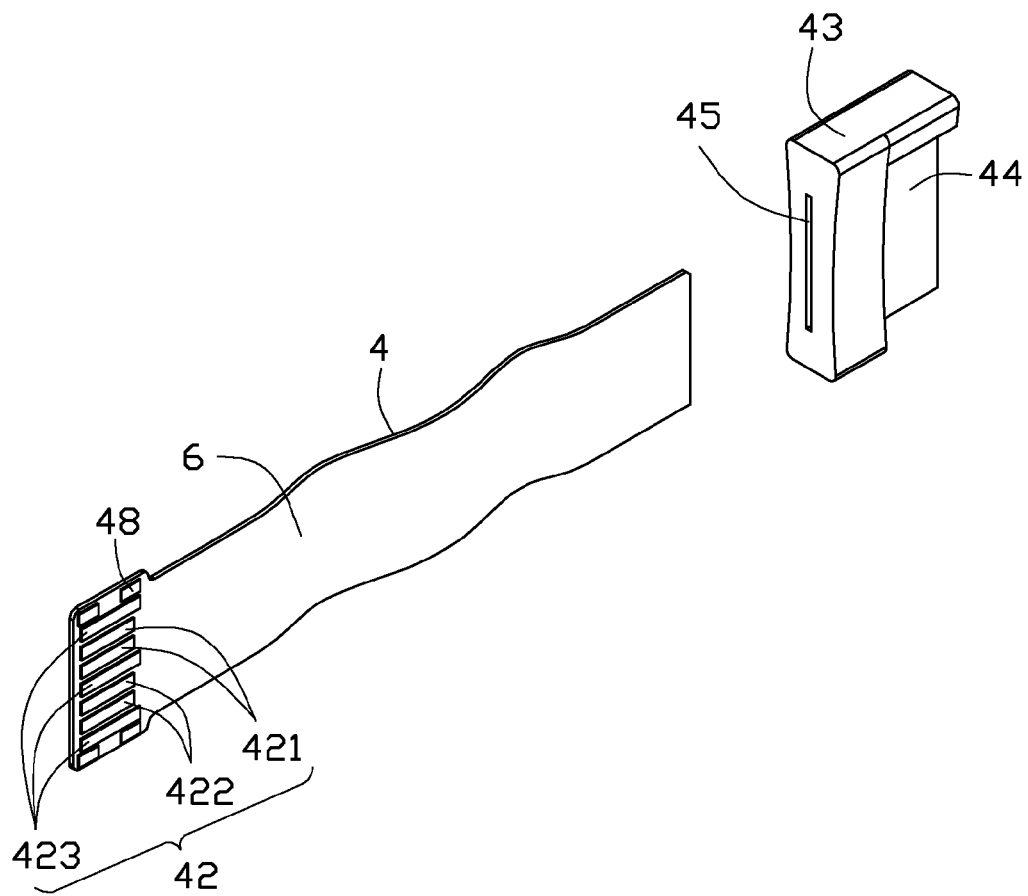
FIG. 3 is an exploded, isometric view of the cable member of FIG. 2.

Referring to FIG. 1 again and also to FIG. 3, the cable member 120 includes a cable 4, a storage device interface 3 extending from a first end of the cable 4, and a third edge connector 42 extending from a second end of the cable 4. The storage device interface 3 includes a connecting shell 43 mounted to the first end of the cable 4, and a fourth edge connector 41 arranged on a first surface 5 of the first end of the cable 4. The fourth edge connector 41 includes a pair of signal input pins 411, a pair of signal output signals 412, and three ground pins 413. An L-shaped fixing portion 44 extends from the connecting shell 43. A through hole 45 is defined in the connecting shell 43, parallel to the fixing portion 44. The first end of the cable 4 extends through the through hole 45, to be fixed to the fixing portion 44. The third edge connector 42 is arranged on a second surface 6 of the second end of the cable 4 opposite to the first surface 5, and four fixing pads 48 are arranged on the second surface 6 and located around the third edge connector 42. The edge third connector 42 includes a pair of signal input pins 421, a pair of signal output signals 422, and three ground pins 423. In one embodiment, the storage device interface 3 accords with a SATA standard.

In assemble, the third edge connector 42 are soldered to the pins of the second edge connector 13, and the fixing pads 48 are soldered to the fixing pads 14, to stable connect the cable member 120 to the SATA DIMM module 110.

In use, the first edge connector 19 is inserted into the memory slot 210. Two fixing elements 230 of the memory slot 210 engage in the grooves 16, to fix the SATA DIMM module 110 to the memory slot 210. The storage device interface 3 is connected to the storage device interface 220 of the motherboard 200 through a cable 7 with two storage device interfaces. In other embodiments, the storage device interface 3 may be directly connected to the storage device interface 220.

When the motherboard 200 receives power, the motherboard 200 outputs a voltage to the SATA DIMM module 110 through the memory slot 210 and the first edge connector 19. At the same time, the motherboard 200 outputs a hard disk drive (HDD) signal to the control chip 11 through the interface 220, the cable 7, the cable member 120, and the second edge connector 13, to communicate with the SATA DIMM module 110.

The SATA DIMM module assembly 100 can communicate with the motherboard 200 through the second edge connector 13 and the cable member 120, to avoid physical interference between the cable member 120 and the chassis, and the cable member 120 and other memory slots of the motherboard 200, which is located adjacent to the memory slot 210.

It is to be understood, however, that even though numerous characteristics and advantages of the disclosure have been set forth in the foregoing description, together with details of the structure and function of the disclosure, the disclosure is illustrative only, and changes may be made in detail, especially in matters of shape, size, and the arrangement of parts within the principles of the disclosure to the full extent indicated by the broad general meaning of the terms in which the appended claims are expressed.

What is claimed is:

1. A serial advanced technology attachment dual-in-line memory module (SATA DIMM) assembly, comprising:
   a SATA DIMM module comprising:
      a circuit board;
      a control chip arranged on the circuit board;
      a plurality of storage chips arranged on the circuit board and connected to the control chip;
      a first edge connector set on a bottom edge of the board, to be inserted into a memory slot of a motherboard, wherein the first edge connector comprising a plurality of power pins and a plurality of ground pins, the plurality of power pins are connected to the control chip and the storage chips; and
      a second edge connector arranged on an end of the circuit board, wherein the second edge connector comprising a pair of signal input pins, a pair of signal output pins, and three ground pins, the signal input pins and the signal output pins are connected to the control chip; and
   a cable member comprising:
      a cable;
      a first storage device interface extending from a first end of the cable to be connected to a second storage device interface of a motherboard; and
      a third edge connector formed on a second end of the cable and soldered to the second edge connector.

2. The SATA DIMM module assembly of claim 1, wherein the first storage device interface comprises a connecting shell and a fourth edge connector formed on the first end of the cable, an L-shaped fixing portion extends from the connecting shell, a through hole is defined in the connecting shell and parallel to the fixing portion, the first end of the cable extends through the through hole to be fixed to the fixing portion, the fourth edge connector is opposite to the fixing portion.

3. The SATA DIMM module assembly of claim 2, wherein the third edge connector comprises a pair of signal input pins, a pair of signal output pins, and three ground pins, the fourth edge connector comprises a pair of signal input pins, a pair of signal output pins, and three ground pins, the third and fourth edge connector accord with SATA standard.

4. The SATA DIMM module assembly of claim 3, wherein four first fixing pads are arranged on the second end of the cable and located around the third edge connector, four second fixing pads are arranged on the circuit board and located around the second edge connector, to be soldered to the first fixing pads.

* * * * *